(12) United States Patent
Hinkle et al.

(10) Patent No.: US 6,716,147 B1
(45) Date of Patent: Apr. 6, 2004

(54) INSULATED SLEEVED ROLL

(75) Inventors: David Leslie Hinkle, Bridgeport, WV (US); Kenneth Royce Schisler, Lumberport, WV (US)

(73) Assignee: Pyrotek, Inc., Carlisle, PA (US)

( * ) Notice: Subject to any disclaimer, the term of this patent is extended or adjusted under 35 U.S.C. 154(b) by 0 days.

(21) Appl. No.: 10/462,427

(22) Filed: Jun. 16, 2003

(51) Int. Cl.$^7$ .................................................. B25F 5/02
(52) U.S. Cl. ............................ 492/45; 492/40; 492/46; 29/895.21
(58) Field of Search ............................. 492/45, 38, 39, 492/40, 46, 47, 54, 50, 49; 29/895.21, 895.2, 895.22, 895.213; 101/375; 193/37

(56) References Cited

U.S. PATENT DOCUMENTS

| | | | | |
|---|---|---|---|---|
| 3,710,469 A | * | 1/1973 | Kitazawa | 492/40 |
| 3,711,913 A | * | 1/1973 | Galeone et al. | 29/895.212 |
| 4,352,230 A | * | 10/1982 | Sukenik | 492/40 |
| 5,097,596 A | * | 3/1992 | Hoogesteger et al. | 29/895.21 |
| 5,205,398 A | * | 4/1993 | Hart et al. | 193/37 |
| 5,759,141 A | * | 6/1998 | Schmitz | 492/39 |
| 5,989,170 A | | 11/1999 | Hart et al. | |
| 6,196,957 B1 | | 3/2001 | Hiraguri et al. | |
| 6,520,896 B1 | * | 2/2003 | Sohl | 492/45 |

\* cited by examiner

*Primary Examiner*—Peter Vo
*Assistant Examiner*—Marc Jimenez

(57) ABSTRACT

An insulating roll comprising: a metal conduit having an outer peripheral portion; a plurality of discs having outer peripheries and preferably fabricated from an inorganic material positioned axially on and around the metal conduit; a tubular shell having an inner surface about and spaced apart from said outer peripheries; metallic foils extending between each or a plurality of said discs from said outer peripheral portion to and beyond said outer peripheries to the inner surface of said tubular shell, said metallic foils being in interference or frictional contact with said inner surface. A novel method for attaching the tubular shell to the conduit to simplify removal and replacement thereof is also described.

12 Claims, 2 Drawing Sheets

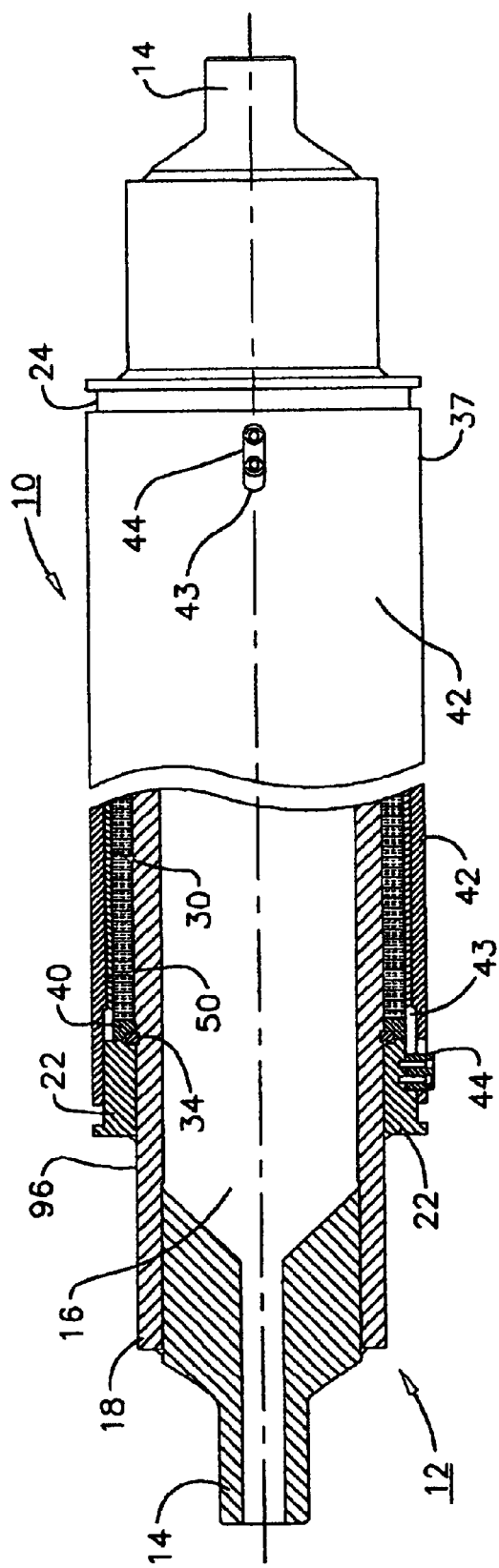
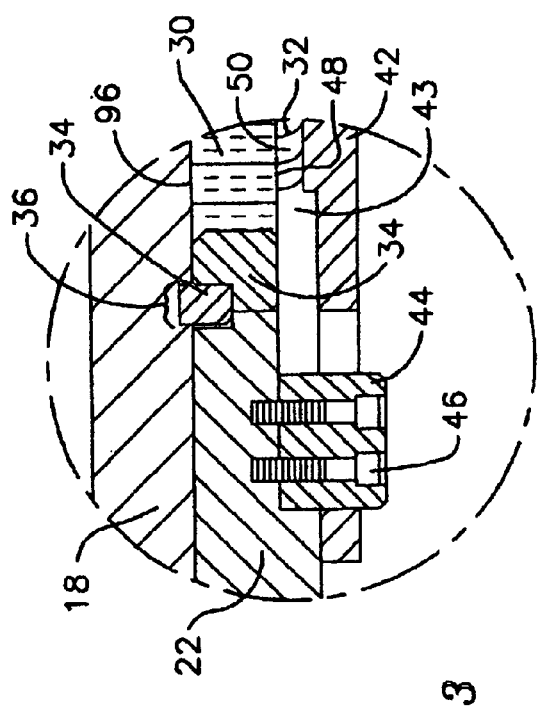
FIG. 2
FIG. 3

INSULATED SLEEVED ROLL

FIELD OF THE INVENTION

The present invention relates to idler or transfer rolls of the type used in, for example, annealing ovens and more particularly to such rolls that, because of their structure allow for reduced thermal fatigue and consequently extended roll life over those of the prior art.

BACKGROUND OF THE INVENTION

The provision of transfer or idler rolls for the transport of material, for example, steel through annealing ovens and the like has been the subject of development for a number of years. At one point such rolls comprised steel that extracted heat at an unacceptable rate. Subsequently, rolls that utilized compacted particulate inorganic materials as a back-up to a steel surface sleeve were designed and used. While these rolls provided some improvement over the steel variety, the compacted inorganic material proved to be too "soft" and over time resulted in the surface of the roll sagging in the area filled with the inorganic material thus resulting in failure of the roll.

In 1999, Hart et al in U.S. Pat. No. 5,989,170 described a roll structure that comprised a plurality of annular discs of a highly compacted ceramic fiber about a central cooling water conduit. Again, while this structure provided an apparent improvement in roll capability by limiting the amount of heat extracted by the roll and providing extended roll life, it was not entirely satisfactory for a number of reasons that are pointed out in U.S. Pat. No. 6,196,957 to Hiraguri et al issued Mar. 6, 2001.

Hiraguri et al describe an insulating roll that is constructed with a roll body formed of a plurality of inorganic material derived discs laminated with each other and positioned axially of and around a metal conduit, and a heat resistant metal tube or shell disposed integrally over an outer periphery of the roll body. The roll described in Haraguri et al is claimed to have low thermal conductivity, and high impact strength without involving reduction of the surface temperature of a material being heat treated in a furnace or reducing the ambient temperature in the furnace during heat treatment. It is to be noted that the claims of this patent were ultimately limited to a structure for retaining the tubular shell on the roll structure. Again, while this revised structure apparently provided some benefits as claimed, the roll demonstrated an inability to operate at very high temperatures, above about 2000° F., due to the presence of welds used to attach a variety of the members to a hollow core. It is also to be specifically noted that in the roll of Hiraguri et al, the axially oriented inorganic material discs are in direct contact with the overlying steel shell at their outer peripheries.

Subsequent to the development described in Hiraguri et al, various apparently unpatented attempts were made to alter the heat transfer characteristics of Hiraguri et al's roll. Among these were the insertion of so-called "foils", i.e. thin strips of stainless steel located between adjacent inorganic material discs or sets of discs that extended partially through the thickness dimension of the array of discs from the outer periphery of the interior water cooling channel outward toward the steel shell. The presence of such "foils" apparently increase the heat exchange capability of the roll of Hiraguri et al a small amount. Again, while this appears to have provided a step in the right direction, it was not enough to adequately extend roll surface shell life.

Accordingly, there remains the need for improvement in the structure of these so-called "insulating rolls" to extend the useful operating life of the steel shell while minimizing heat extraction from the heat treatment process.

OBJECT OF THE INVENTION

It is therefore an object of the present invention to provide a roll structure that provides minimal heat extraction from the heat treatment process while providing sufficient heat extraction from the roll surface to optimize the life of the operating life of the roll surface shell.

It is another object of the present invention to provide a novel method for the attachment of a tubular shell to a water cooled roll.

SUMMARY OF THE INVENTION

According to the present invention, there is provided, an insulating roll comprising: a metal conduit having an outer peripheral portion; a plurality of discs having outer peripheries and fabricated from an inorganic material positioned axially on and around the metal conduit; a tubular shell having an inner surface about and spaced apart from said outer peripheries; metallic foils extending between each or a plurality of said discs from said outer peripheral portion to and beyond said outer peripheries to the inner surface of the tubular shell, said metallic foils being in interference or frictional contact with said inner surface. A novel method for attaching the tubular shell to the conduit to simplify removal and replacement thereof is also described.

DESCRIPTION OF THE DRAWINGS

FIG. 2 is partially cross-sectional and partially plan view of one embodiment of the roll of the present invention.

FIG. 3 is a detailed cross-sectional view of one embodiment of the key area of one embodiment of the roll of the present invention.

DETAILED DESCRIPTION

Figure 1:
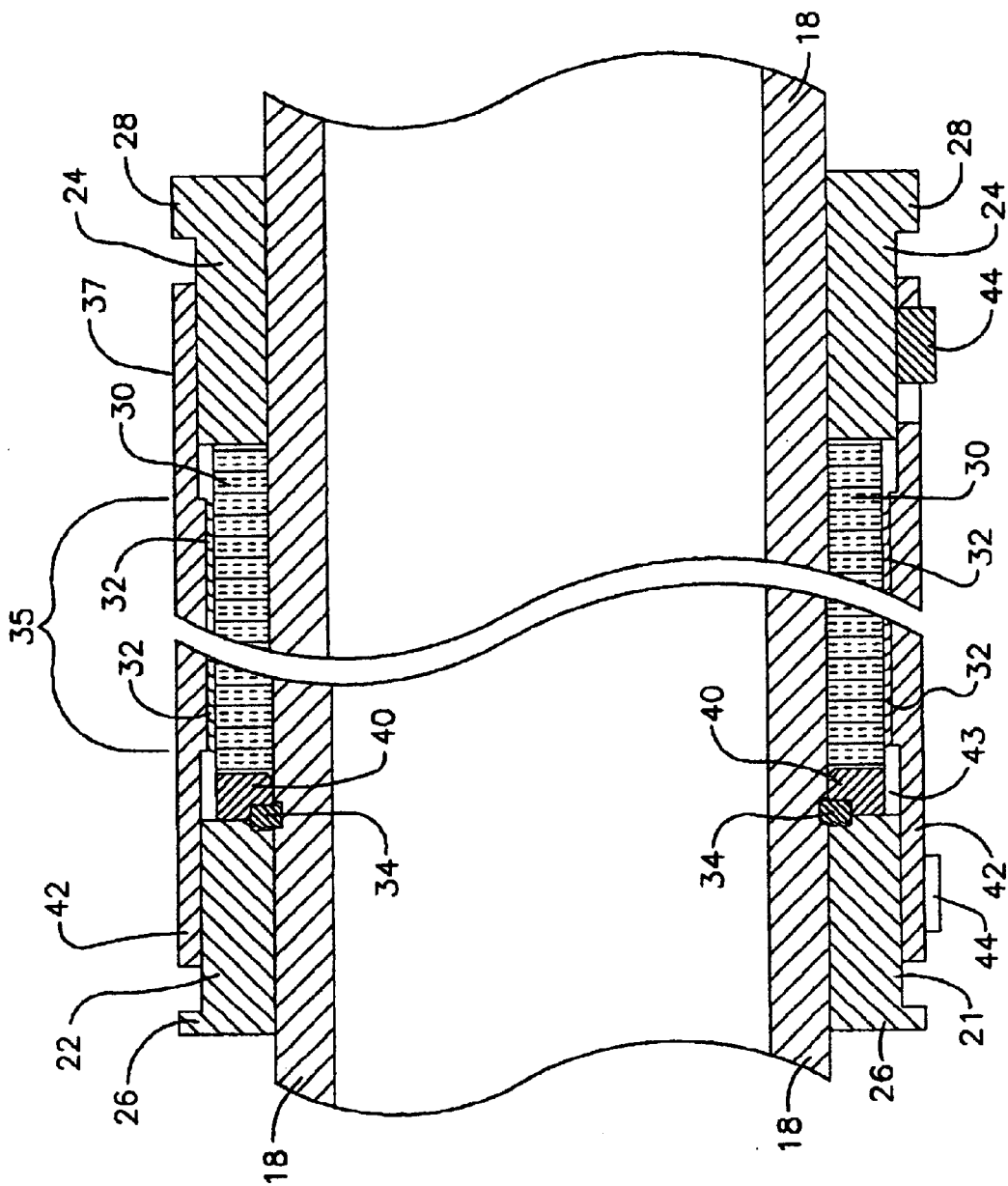
FIG. 1 is a cutaway cross-sectional view of one embodiment of the roll of the present invention.

Referring now to FIG. 2, the roll 10 of the present invention comprises a roll core 12 consisting of a tubular member 18, a conduit 16 for the passage of a cooling fluid such as water, and journals 14 for mounting in a bearing structure (not shown). While such an arrangement simplifies fabrication of roll 10, it will be obvious to the skilled artisan that roll core 12 could be machined or otherwise fabricated. Affixed either permanently by welding or removably by a threaded type of connection to the outer periphery of tubular member 18 are annular flanged spacers 22 and 24 (best seen in FIG. 1) that serve to contain further elements described more fully below. Annular flanges 26 and 28 may be separate from spacers 22 and 24, described below, or form individual portions of a single integral part.

Annular flanged spacer 22 and press ring 40 serve to contain annular inorganic material discs 30. According to a preferred embodiment for the securing of annular discs 30 shown in the various Figures, a compressed assembly of annular discs 30, referred to hereinafter as a disc bundle, including foils 32, as described more fully below, is inserted between flanged spacer 24 and press ring 40 and secured in place by snap ring 34 that engages a recess 36 in tubular member 18 and a recess 38 in retention member 40, the latter serving to maintain the compression of discs 30 and foils 32 into the disc bundle. The area 35 that coincides with the axial extent of annular discs 30 is referred to herein and in the attached claims as the "working area", i.e. that area of outer surface 37 of tubular shell 42 that can be expected to contact material passing over and in contact with roll 10 during operation.

Overlying but separated from the outer periphery of discs 30 is tubular shell 42. Tubular shell 42 is maintained in position on roll assembly 10 through the action of second keys 44 that engage tubular shell 42 through longitudinally "oversized" apertures 43 in tubular shell 42 preferably located outside of the working area 35 of roll 10, i.e. that area beyond the limits of compressed annular discs 30, i.e. the disc bundle, and engages shoulders in annular flanged spacers 22 and 24. The term longitudinally "oversized" means and refers to the fact that apertures 43 are longer in the longitudinal direction than keys 44 and of a size in the peripheral direction as to appropriately retain keys 44 in apertures 43. In this fashion tubular shell 42 is restrained from rotational movement about tubular member 18 yet is permitted to "grow and "shrink" longitudinally as well as radially as it heats and cools during use. Keys 44 are held in position by at least one and preferably a pair of bolts such as socket head cap screws 46 whose base(s) are secured into annular flanged spacers 22 and 24 in the embodiment depicted in the attached Figures. Longitudinally "oversized" apertures 43 thus allow for the longitudinal and radial movement or growth of tubular shell 42 in expansion as tubular shell 42 is heated during operation. This attachment mechanism for tubular shell 42 to roll 10 is novel and forms part of the instant invention. As will be apparent to the skilled artisan, one can relatively easily envision a design where keys 44 engaged slots or other openings in the inner surface of tubular shell 42 within the working area of the roll, however, this is not generally preferred as such a design might affect the heat exchange/transfer capabilities of roll 10. Additionally, the term "key" as used herein is meant to include attachment mechanisms that utilize alternatives to rectangular keys such as, for example, pins or other securing devices that attach to tubular member 18 and engage one or more "oversized" apertures in tubular shell 42 to allow for growth thereof while limiting rotation about conduit 16 and tubular member 18.

As best seen in FIGS. 1 and 3, foils 32, preferably of stainless steel, are laminated into the laminated or compressed assembly of discs 30, the disc bundle, by the insertion of foils 32 between each of discs 30 or pairs or other numbers of discs 30 as may be desirable prior to compression. An important element toward achieving the heat removal capabilities of roll 10 of the present invention is that foils 32, regardless of their number or spacing between discs 30, extend from the outer annular surface 96 of tubular member 18 through and beyond the outer periphery 48 of compressed discs 30 such that they are in frictional or interference fit with inner peripheral surface 50 of tubular shell 42. The presence of foils 32 in this configuration provides at least two distinct advantages. Firstly, they provide a direct path for the exchange of heat between tubular shell 42 and the outer surface 96 of tubular member 18 and, secondly, because of their interference fit they also serve to provide a certain amount of structural support to tubular shell 42 during operation. While this amount of support may seem relatively small it has been shown to be actual and to extend the operating life of roll 10 beyond that of similar prior art such devices. The increased heat exchange provided by the extended configuration of the foils also allows for the more efficient removal of heat from tubular shell 42 thereby reducing the degradation of tubular shell 42 due to exposure to high temperatures, thermal fatigue. With the configuration described: 1) the temperature of tubular shell 42 can be more carefully controlled without significantly increasing the cooling effects in, for example, an annealing oven that can result in the consumption of additional fuel to maintain an elevated temperature in such a device, or 2) the amount of water that must be circulated through conduit 16 to obtain appropriate cooling of tubular shell 42.

Thus, when assembled by the insertion of roll core 12 or tubular member 18 having annular discs 30 attached thereto as described above, into a new or reworked tubular shell 42, foils 32 enter into interference fit into the inner periphery 50 of tubular shell 42 providing the support and heat exchange advantages described above.

There has thus been described a novel insulating/sleeved transfer/idler roll system that provides a simplified and reliable method for the attachment of a replaceable tubular roll shell as well as a novel interior roll configuration that provides enhanced shell cooling control. The use of foils that extend from the outer surface of an interior conduit to and beyond the outer periphery of an annular laminated/compressed inorganic material disc bundle to frictionally/interferentially engage the inner surface of a tubular outer shell has also been described along with its apertenant benefits.

While the tubular shell described herein is currently fabricated from metal, it will be readily apparent to the skilled artisan that in view of the method of attachment described herein, tubular shell 42 could be fabricated from any number of alternative materials, for example, ceramics or cermets that can be fabricated into tubular shapes as described herein for tubular shell 42.

As the invention has been described, it will be apparent to those skilled in the art to which this invention applies that the same may be varied in many ways without departing from the spirit and scope of the invention. Any such modifications are intended to be included within the scope of the appended claims.

What is claimed is:

1. An insulating roll comprising:
    A) a metal conduit having an outer peripheral portion including a working area and opposing ends;
    B) a plurality of discs having outer peripheries, fabricated from an inorganic material and defining a disc bundle positioned axially on and around the metal conduit, said disc bundle having opposing ends;
    C) a tubular shell having an inner surface about and spaced apart from said outer peripheries and including the working area and opposing ends;
    D) metallic foils between each or a plurality of said discs extending from said outer peripheral portion to and beyond said outer peripheries to but not beyond the inner surface of said tubular shell, said metallic foils being in frictional contact between said inner surface and said outer peripheries.

2. The insulating roll of claim 1 wherein said tubular shell is fabricated from metal.

3. The insulating roll of claim 1 wherein said tubular shell is retained in place by the engagement of at least one key removably attached directly or indirectly to the outer periphery of said metal conduit outside of the working area and engaging at least one longitudinally oversized aperture in said tubular shell thereby allowing for axial and radial growth of said shell upon heating during operation while limiting rotational movement of the tubular shell.

4. The insulated roll of claim 3 further including a pair of annular spacers between said disc bundle opposing ends and said tubular shell outside of the working area which spacers engage the opposing ends of said disc bundle and said tubular shell.

5. The insulating roll of claim 4 further including a recess on said spacers that engages said at least one key.

6. The insulating roll of claim 4 wherein said at least one key is retained in place through the action of one or more bolts that penetrate said at least one key and engage said spacer or said outer periphery of said metal conduit.

7. An insulating roll comprising:
   A) a metal conduit having an outer peripheral portion including a working area and opposing ends;
   B) a plurality of discs having outer peripheries, fabricated from an inorganic material and defining a disc bundle positioned axially on and around the metal conduit, said disc bundle having opposing ends;
   C) a tubular shell having an inner surface about and spaced apart from said outer peripheries and including a working area and opposing ends;
wherein said tubular shell is retained in place by the engagement of at least one key removably attached directly or indirectly to the outer periphery of said metal conduit outside of the working area and engaging a longitudinally oversized aperture in said tubular shell thereby allowing for axial and radial growth of said shell upon heating during operation while limiting rotational movement of the tubular shell.

8. The insulated roll of claim 7 further including a pair of annular spacers between said outer periphery and said tubular shell outside of the working area which spacers engage the opposing ends of said disc bundle opposing ends and said tubular shell.

9. The insulating roll of claim 8 further including a recess on said spacers that engages said at least one key.

10. The insulating roll of claim 8 wherein said at least one key is retained in place through the action of one or more bolts that penetrate said at least one key and engage said spacers or said outer periphery of said metal conduit.

11. The insulating roll of claim 7 further including metallic foils between each or a plurality of said discs extending from said outer peripheral portion to and beyond said outer peripheries to the inner surface of said tubular metal shell, said metallic foils being in frictional contact with said inner surface.

12. The insulating roll of claim 7 wherein said tubular shell is fabricated from a metal.

\* \* \* \* \*